United States Patent [19]
Pircon

[11] 3,853,506
[45] Dec. 10, 1974

[54] POLLUTION CONTROL APPARATUS AND METHOD

[75] Inventor: Ladislav J. Pircon, Emlhurst, Ill.

[73] Assignee: The Purity Corporation, Elk Grove Village, Ill.

[22] Filed: Oct. 18, 1971

[21] Appl. No.: 190,248

[52] U.S. Cl............................. 55/91, 55/96, 55/223, 55/240, 55/257, 55/290, 55/462
[51] Int. Cl............................................. B01d 45/10
[58] Field of Search........... 55/1, 84, 89, 90, 91, 96, 55/223, 229, 233, 240, 241, 242, 257, 258, 260, 290, 295–299, 462

[56] References Cited
UNITED STATES PATENTS

| | | | |
|---|---|---|---|
| 2,668,754 | 2/1954 | Lichtenfels | 55/89 |
| 2,994,406 | 8/1961 | Hemeon | 55/242 |
| 3,292,913 | 12/1966 | Craig | 55/229 |
| 3,525,309 | 8/1970 | Katz | 55/223 |
| 3,596,440 | 8/1971 | Nutler | 55/462 |

FOREIGN PATENTS OR APPLICATIONS

| | | | |
|---|---|---|---|
| 389,445 | 6/1931 | Great Britain | 55/232 |
| 490,160 | 8/1938 | Great Britain | 55/232 |
| 759,936 | 10/1956 | Great Britain | 55/290 |

*Primary Examiner*—Bernard Nozick
*Attorney, Agent, or Firm*—Alexander and Speckman

[57] ABSTRACT

Apparatus for removing pollutants from a gas stream comprises a chamber having a gas stream inlet, a gas stream outlet and a pollutant discharge opening. An endless travelling belt of substantially imperforate material is arranged generally within the chamber with a portion of it confronting the gas stream inlet in impingeable relationship with the entering gas stream.

14 Claims, 1 Drawing Figure

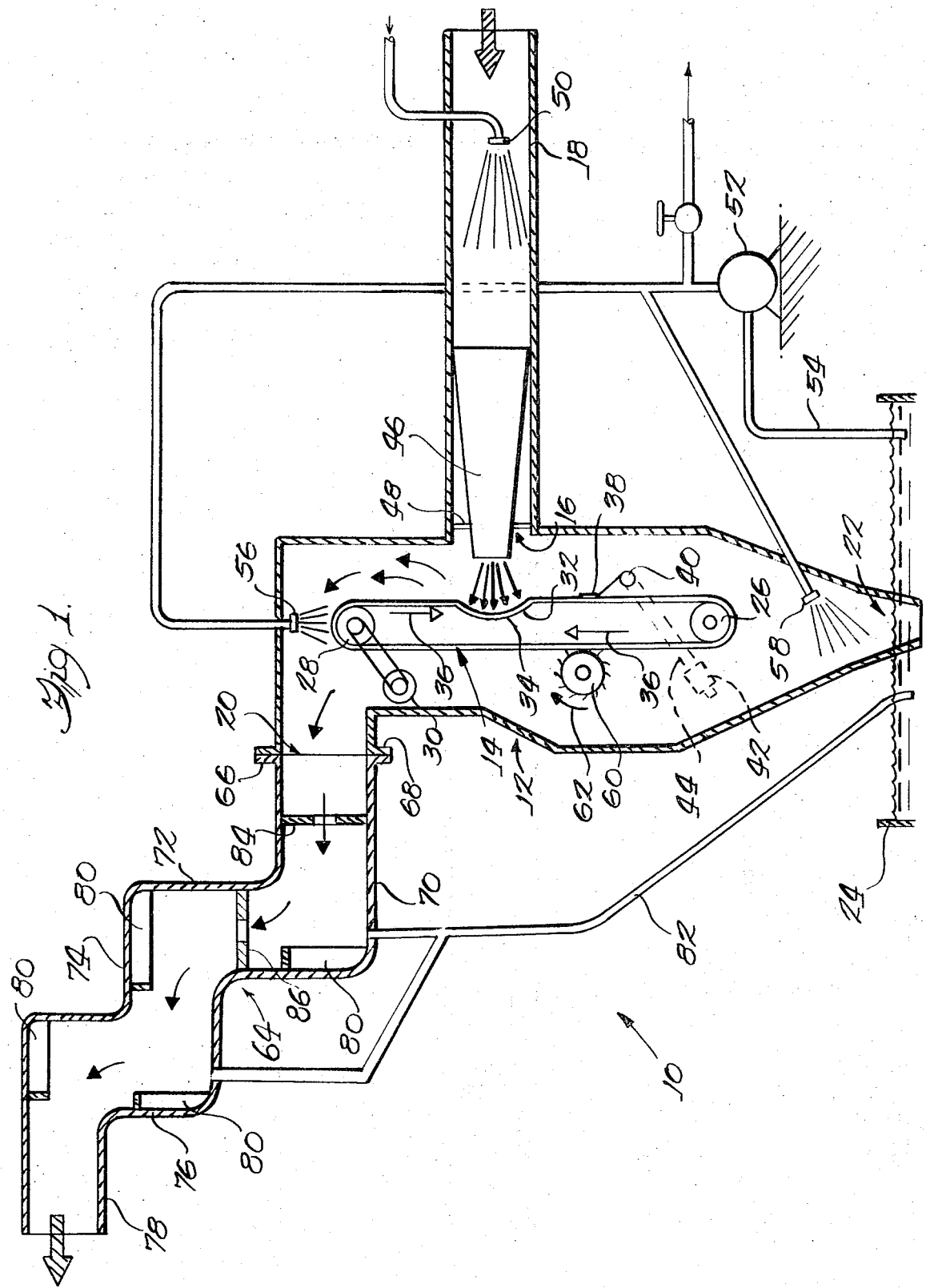

POLLUTION CONTROL APPARATUS AND METHOD

This invention relates generally to pollution control equipment and more particularly to apparatus for removing gas dispersoids from stack and aperture effluvia.

The general concern of the public and industry alike for the quality of the environment, particularly as expressed in modern pollution control laws, has intensified the search for more efficient and more economical means for controlling industrial effluvia; and special attention has been directed to the control of the discharge of undesirable gaseous and particulate pollutants into the atmosphere. In the past, cyclone separators, bag collectors and electrostatic precipitators have been commonly employed for this purpose. However, conventional cyclone separators do not achieve more than a moderate degree of particulate removal and are not considered effective in controlling emissions of pulverulent particles. Bag filters, by contrast, are of greater efficiency, even of finely divided solids, but are encumbered with the considerable expense of bag replacement. Bag filters also exhibit declining efficiency as the bags fill in use and are incapable of handling hygroscopic or tacky particulates. Electrostatic precipitators have also been utilized but these present explosion hazards in certain environments as well as corrosion problems because of electrical conductivity property limitations.

Therefore, an important object of the present invention is to provide a gas decontaminator which is highly efficient and useful in a wide variety of applications.

A more general object of the invention is to provide new and improved apparatus for removing pollutants from a gas stream.

Another object of the invention is to provide a gas decontaminator which is continuous in its operation.

Still another object of the invention is to provide a gas decontaminator which is self-cleaning and non-clogging.

And still another object of the invention is to provide a gas decontaminator which can be used with high temperature gas streams.

A further object of the invention is to provide a new and improved method of purifying a gas stream.

These and other objects and features of the invention will become more apparent from a consideration of the following descriptions.

In order that the principles of the invention may be readily understood, a single embodiment thereof, but to which the application is not to be restricted, is shown in the accompanying drawing wherein:

FIG. 1 shows a diagrammatic view of one form of the apparatus of the invention.

In the practice of the invention, a polluted gas stream is impinged on a moving, imperforate member, and the collected pollutants are removed from the travelling member.

Referring now in detail to the drawing, apparatus for removing gas dispersoids from stack and aperture effluvia is indicated generally by the reference numeral 10; and it is to be understood that the term "gas dispersoids" is intended to refer to pollutant gases and both pollutant liquids and solids that have been reduced to finely divided form. The apparatus 10 comprises a main work vessel or processing chamber 12 and an endless travelling belt 14 which is fabricated from a flexible, substantially imperforate material such as woven metal belts that have been surfaced with flexible foil or other sheet material, rubber belting, or tightly woven cloth fabrics. The chamber 12 is conveniently arranged to have a greater dimension in the vertical direction than in the lateral and is provided with a gas stream inlet 16 which opens horizontally into a gas delivery conduit 18. The chamber 12 also is fashioned with a gas stream outlet 20 which, in the disclosed embodiment, is located vertically above and generally horizontally opposite the inlet 16. Finally, the chamber 12 is fabricated with a pollutant discharge opening 22 which is advantageously sealed off by being submerged beneath the liquid contained in a holding tank 24 or which is connected to a substantially dry removal system.

The endless travelling belt 14 is trained over a lower idler roller 26 and an upper companion roller 28 which is driven from a suitably energized motor 30, the rollers 26 and 28 being generally vertically aligned spanning the gas stream inlet 16 so that a portion 32 of the belt 14 confronts the gas stream inlet in impingeable relationship with the entering gases. Advantageously, the idler roller 26 is adjusted to accomplish a concavity 34 at the impingement portion 32 in order to tend to trap generally upwardly flowing particles. The travelling belt 14 is driven in the general direction of arrows 36, running from the driven roller 28, past the impingement region and toward the roller 26, i.e. in a generally downward direction past the gas stream inlet 16. Where the collected particulates do not flake off the belt 14 on traversing the curvature of roller 26 or where maximum belt cleaning is desired, a skimmer or scraper element 38 is disposed generally between the impingement section and the roller 26 and is swingably mounted on a pivot rod 40 to be urged into cleaning contact with the surface of the travelling belt by means of a counterweight 42 which is adjustably mounted on an arm 44 in order to regulate the cleaning pressure which is applied by the skimmer 38 to the surface of the belt. A spring may, of course, be substituted for the counterweight 42.

The conduit 18 is connected to the exhaust from some pollution source such as grinding, crushing, or other size reduction operations or the spray drying of milk or other such liquids, the polluted air or other gases being impelled into the conduit 18 under a certain velocity by means of a blower or other like device, not shown. In order to accelerate the polluted gas stream toward the impingement section of the travelling belt 14, a convergent cone 46 is mounted in the gas stream inlet of chamber 12 by means of an annular plate 48. In one useful embodiment of the invention, the cone 46 has been arranged to provide a four-fold increase in the velocity of a polluted gas stream having an initial velocity of approximately 1,000 lineal feet per minute. In addition, particulate separation has been further promoted by spraying a mixture of a suitable scrubbing liquid into the gas stream in advance of the cone 46. Accordingly, a spray device 50 is situated in the delivery conduit 18 generally as shown; and a selected, clear liquid, such as potable water, is forced under pressure through the spray device 50 from a suitable source. Under certain circumstances, differences in electrical charge between the droplets and the particulate pollutants enhances the removal efficiency.

Conveniently, a pump 52 withdraws liquid from the bank 24 or some other source through an inlet line 54 and is provided with a valved discharge line. Enhanced pollution removal is achieved by supplying suitable quantities of liquid to the endless belt 14 in advance of the impingement section 32. Hence, a spray device 56 is focussed to direct a spray of suitable liquid over the outer surface of belt 14 as the belt passes over the driven roller 28. The liquid in tank 24 may serve as the supply for liquid being delivered by the spray device 56. A third spray device 58 is advantageously focussed toward the pollutant discharge opening 22 in order to contact and moisten the solids which have been scraped from the outer surface of the travelling belt by the skimmer 38. Suitable pipe lines connect the spray devices 56 and 58 to the outlet of pump 52 as shown in the drawing.

An auxiliary cleaning arrangement comprising a rotary brush 60 is disposed in contact with the outer surface of the travelling belt 14 beyond the region of gas impingement in the direction of belt travel, being advantageously situated generally opposite the skimmer 38 and rotated generally into the direction of belt travel as indicated by the arrow 62.

In compliance with an important feature of the present invention, a tower eliminator unit 64 is connected to the gas stream outlet 20 of the processing chamber 12, the tower eliminator unit 64 providing a deflected exhaust gas pathway and being advantageously fastened to the chamber 12 by cooperating flanges 66 and 68. The tower eliminator arrangement 64 is particularly adapted to remove fine droplets of liquid remaining in the gas stream together with any solids or gases trapped by such droplets; and in order to reduce the velocity of these droplets so that they may become separated from the gas stream, the tower eliminator arrangement includes a first generally horizontal section 70, a subsequent, generally vertical section 72, a further horizontal section 74, a succeeding vertical section 76 and a final horizontal section 78. As will be appreciated, the several offset sections of the tower eliminator arrangement 64 provide a tortuous escape path for the exhaust gases whereby to maximize the opportunity for mist elimination. In addition, a sequence of baffles 80 is situated in the individual eliminator sections at the respective downstream ends thereof so as to insure entrapment of liquid droplets. Furthermore, a gravity drain 82 is provided in the tower eliminator arrangement 64 to drain accumulated liquids from the tower eliminator to beneath the surface of the liquid in tank 24.

It has proved advantageous to insure high velocity in the gas stream entering the tower eliminator arrangement 64; and therefore, an orifice plate 84 is disposed in the first eliminator section 70 adjacent the gas stream outlet 20 of the main processing chamber 12, the orifice plate 84, in one practical embodiment of the invention, being arranged to provide a four-fold increase in the velocity of the gas stream. If greater separation efficiency is desired, a second orifice plate 86 is situated downstream from the orifice plate 84.

The gas decontaminator apparatus of the invention is useful in collecting a wide variety of liquid, gaseous and solid dispersoids; and in one useful embodiment of the apparatus of the invention employing a duct 18 of 12-inch internal diameter and a vena contracta in the venturi 46 of 6-inch diameter, the spray device 50 being spaced from the venturi cone for optimum efficiency, an air stream containing quarry dust was treated, all of the solid particulate pollutants of this material passing a 24-mesh Tyler screen with 20 percent passing a 325-mesh Tyler screen. With gas velocities through the equipment of from 800 cubic feet per minute to 1,500 cubic feet per minute, removal efficiencies of from 99.4 to 99.8 percent were experienced.

As will be appreciated, when the travelling belt 14 is fabricated from metal or other heat resistant materials, no pre-cooling of the inlet gas stream is required. Moreover, since impingement collection rather than filtration is employed, diliquescent and hygroscopic materials may be readily handled and continuous operation is made feasible. Furthermore, since there are no electrical connections with the gases being treated, explosion potential is avoided and combustible substances may be readily removed. Finally, a solvent or liquid reactant may be discharged from the spray devices 50, 56 and 58, as for example might be desirable in the production of diammonium phosphate fertilizer where dilute phosphoric acid can be selected as the sprayed liquid in order to remove gaseous ammonia, or, for example, where an alkaline reagent such as lime water, can be employed to remove sulfur dioxide.

The drawing and the foregoing descriptions are not intended to represent the only form of the invention in regard to the details of its practice, construction and manner of operation. Changes in form and in the proportion of parts, as well as the substitution of equivalents, are contemplated as circumstances may suggest or render expedient; and although specific terms have been employed, they are intended in a generic and descriptive sense only and not for purposes of limitation, the scope of the invention being delineated in the following claims.

The invention is claimed as follows:

1. The method of removing pollutants from a gas stream comprising the steps of:
   a. directing a moving pollutant-containing gas stream through a gas stream inlet confronting the concave portion of an endless traveling belt of substantially imperforate material disposed within a chamber with an impingement portion thereof confronting said gas stream inlet;
   b. driving said belt trained over an idler roler which is spaced from a driving means and includes an adjustment means to provide said concavity;
   c. removing the pollutant impinged on said traveling belt, and;
   d. separately removing the clean gas stream.

2. The method according to claim 1 which further comprises the step of increasing the velocity of the gas stream prior to its engagement with the travelling member.

3. The method of claim 1 which further comprises the step of introducing liquid spray into said gas stream prior to directing said gas stream against said imperforate member and separately removing the clean gas stream through a tortuous pathway to eliminate liquid droplets.

4. Apparatus for removing pollutants from a gas stream comprising: a chamber having a gas stream inlet, a gas stream outlet and a pollutant discharge opening; an endless travelling belt of substantially imperforate material disposed generally within said chamber with an impingement portion thereof confronting said gas stream inlet, said impingement portion having concavity opposite to said gas stream inlet; drive means for producing movement of said belt; and an idler roller over which said belt is trained and spaced from said drive means, including adjustment means to provide said concavity.

5. Apparatus according to claim 1 which further includes a spray device ahead of said gas stream inlet.

6. Apparatus according to claim 4 which further includes liquid-containing tank means submerging said pollutant discharge opening to provide a seal.

7. Apparatus according to claim 4 which further includes mechanically cleaning means engaging said belt beyond the region of gas impingement in the direction of belt travel.

8. Apparatus according to claim 4 which further includes liquid discharge means focussed to direct scrubbing liquids toward said belt.

9. Apparatus according to claim 4 which further comprises gas stream velocity increasing means disposed in said gas stream inlet.

10. Apparatus according to claim 9 wherein said gas stream velocity increasing means is a convergent cone.

11. Apparatus according to claim 4 which further includes tower eliminator means connected to the gas stream outlet of said chamber to eliminate liquid droplets.

12. Apparatus according to claim 11 which further includes gas stream velocity increasing means disposed in said tower eliminator means.

13. Apparatus according to claim 11 wherein said tower eliminator means comprises a plurality of conduit sections connected in sequence and offset with respect to each other.

14. Apparatus according to claim 13 wherein said tower eliminator means further includes baffle means in said conduit sections.

* * * * *